Patented Apr. 10, 1951

2,548,185

UNITED STATES PATENT OFFICE 2,548,185

2,2,3-SUBSTITUTED BUTANES

Jerome C. Westfahl, Trumansburg, N. Y., and Daniel S. Sears, Cuyahoga Falls, Ohio, assignors to The B. F. Goodrich Company, New York, N. Y., a corporation of New York No Drawing. Original application June 25, 1948, Serial No. 35,286. Divided and this application April 7, 1949, Serial No. 87,377

3 Claims. (Cl. 260—484)

This invention relates to a method for the preparation of novel dimers of 2-carboalkoxy-1,3-butadienes which method involves the pyrolysis of certain 2,2,3-substituted butanes.

We have now discovered that novel dimers of 2-carboalkoxy-1,3-butadienes may be readily prepared by the pyrolysis of substituted butanes of the general formula

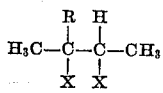

wherein R is a carboalkoxy radical and each X is a radical derived by removing an acidic hydrogen atom from an acid which is volatile at the temperature of pyrolysis. Accordingly X may be halogen such as chlorine, bromine, iodine and fluorine, or an acyloxy radical such as acetoxy, propionoxy, butoxy, valeroxy, caproxy and acyloxy radicals of other organic acids which are volatile at the pyrolysis temperature.

The substituted butanes which are pyrolyzed to obtain dimers of 2-carboalkoxy-1,3-butadienes in accordance with this invention have not heretofore been prepared, but may be readily obtained in a variety of ways. One method of preparing the compounds wherein R is a carboalkoxy radical and each X is halogen consists in treating a mixture of angelic and tiglic acids with thionyl chloride to obtain 2-methyl-2-butenoyl chloride. This compound is then converted into alpha-methyl-alpha, beta-dihalo butyryl chloride by treatment with a halogen in a solvent medium and in the presence of ultraviolet light. The dihalo butyryl chloride is then converted into an ester by reaction with an alcohol in the usual manner.

The compounds of the above general formula wherein each X is an acyloxy radical may be obtained by adding a mixture of angelic and tiglic acids to formic acid and then adding hydrogen peroxide to the mixture and refluxing the resulting solution with aqueous alkali to obtain 2-methyl-2,3-dihydroxy butyric acid. The crude dihydroxy acid is esterified by treatment with an acid anhydride in the presence of pyridine to give a 2-carboxy-2,3-diacyloxy butane. The carboxyl group of this compound is then esterified by reaction with a diazo alkane or an alcohol in the usual manner.

The above two general reactions may be formulated as follows:

I

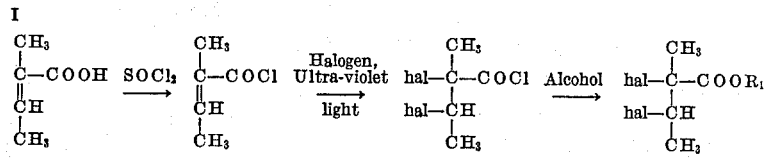

wherein hal denotes halogen and $R_1$ an alcohol radical.

II

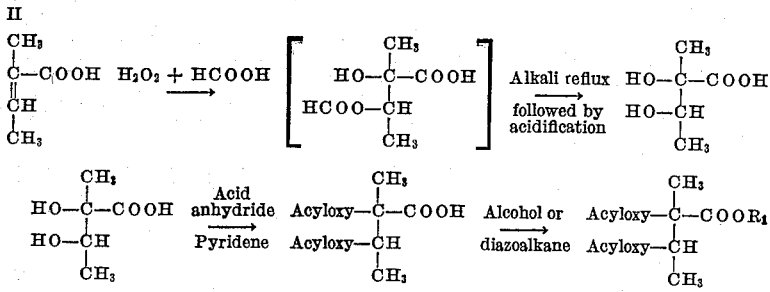

wherein $R_1$ denotes an alcohol radical.

The novel dimers of 2-carboalkoxy-1,3-butadienes which are obtained by the pyrolysis of compounds of the formula

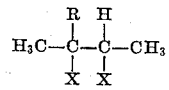

wherein X and R have the meaning set forth above are generally colorless oils which have the structure

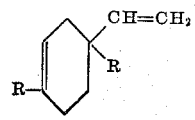

wherein each R is a carboalkoxy radical and the pyrolysis reaction by which they are obtained proceeds substantially as follows:

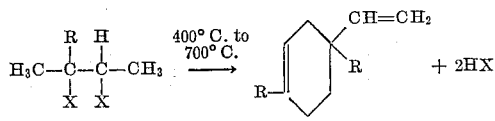

The pyrolysis reaction can be conducted in several different manners. For example, one method involves passing vapors of the substituted butane through a heated glass tube which is connected to a receiver, preferably provided with external cooling means so as to liquify the pyrolysis product. If desired, the vapors may be passed through the pyrolysis tube together with an inert diluent gas or vapor such as nitrogen or carbon dioxide in order to insure complete passage of the vapors through the pyrolysis tube.

Variations in the above procedure involve the use of glass bead packing in the pyrolysis tube or the use of a metal pyrolysis tube instead of glass, or pyrolyzing the starting material over a hot resistance wire.

The pyrolysis reaction is preferably carried out at atmospheric pressure, although reduced pressures as low as 1 mm. or lower are operative.

The temperature at which the pyrolysis is conducted may be varied widely. Temperatures in the range of 400° C. to 700° C. may be used, with the preferred range being from 400° C. to 500° C.

The product of the pyrolysis, usually collected as a liquid, is a mixture of the 2-carboalkoxy-1,3-butadiene dimer and a small amount of the volatile acid produced during the pyrolysis, the major portion of the volatile acid having been driven off during the reaction. The product is then neutralized and extracted with ether. After removal of the ether, the residue is fractionally distilled to recover the pure 2-carboalkoxy-1,3-butadiene dimer, or the dimer is separated from the residue in other usual ways.

The following examples are intended to illustrate the preparation of the substituted butanes of the formula

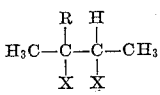

wherein X and R have the same meaning as above, and the pyrolysis of such compounds to dimers of 2-carboalkoxy-1,3-butadienes. It is not intended, however, to limit the invention thereto, for there are, of course, numerous modifications. All parts are by weight.

*Example I*

347 parts of 2-methyl-2-butenoyl chloride (prepared from a mixture of angelic and tiglic acids by treatment with thionyl chloride) are converted into alpha-methyl-alpha, beta-dibromo butyryl chloride by adding the acid chloride dropwise to a solution of 460 parts of bromine in 1300 parts of carbon tetrachloride illuminated with ultra-violet light. 653 parts of the dibromo acid chloride (B. P. 85.5 to 86° C. at 10 mm.) are obtained from the carbon tetrachloride solution by distillation. The dibromo butyryl chloride is then converted into methyl (2-methyl-2,3-dibromo) butyrate by adding the dibromo butyryl chloride dropwise to 100 parts of methanol. The reaction mixture is stirred and heated to the reflux temperature of methanol until the addition is complete. The mixture is then diluted with water and neutralized with potassium carbonate. A 75% yield of methyl (2-methyl-2,3-dibromo) butyrate (B. P. 89.5 to 90° C. at 10 mm.) is obtained by ether extraction and distillation.

*Example II*

Vapors of the methyl (2-methyl-2,3-dibromo) butyrate prepared in Example I are passed together with a current of carbon dioxide through a glass pyrolysis tube and at a temperature of 575° C. The dimer of 2-carbomethoxy-1,3-butadiene is obtained in substantial yield. Neutralization equivalent: Found, 195.94—calculated 196.20. The acid prepared by saponification of the dimer obtained above, gave the following analysis:

|  | Found | Calculated |
|---|---|---|
| Per Cent Carbon | 61.26 | 61.21 |
| Per Cent Hydrogen | 6.11 | 6.17 |
| Per Cent Oxygen | 32.63 | 32.63 |

*Example III*

77.4 parts of mixed angelic and tiglic acids are added to 335 parts of formic acid in a reactor equipped with stirrer and condenser and hydroxylated to 2-methyl-2,3-dihydroxy butyric acid by adding 92.2 parts of 30% hydrogen peroxide over a period of 1½ hours. The temperature of the reaction is maintained at 40° to 45° C. After removal of excess peroxide and formic acid, the resulting solution is treated with 98.1 parts of potassium hydroxide in 350 parts of water and then with 85.8 parts of concentrated sulfuric acid. 72.6 parts of crude dihydroxy butyric acid are recovered by ether extraction.

The crude dihydroxy acid is acetylated to the corresponding diacetoxy acid by heating with 132.4 parts of acetic anhydride and 5 parts of pyridine at 100° C. for 2¾ hours. After removal of the excess acetic anhydride and acetic acid by further heating at 60° C. and a pressure of 1.5 mm., 118.7 parts of crude 2-methyl-2,3-diacetoxy butyric acid are obtained. This acid is converted into its methyl ester by dissolving it in ether to a total volume of 500 ml. and treating the solution with a slight excess of diazomethane. The ether is then removed by vacuum distillation, and the light brown oil which remains is distilled at a temperature of 75° to 95° C. and a pressure of 1.5 mm. Redistillation at 103° to 108° C. and 5 mm. pressure gives 73 parts of pure colorless methyl (2-methyl-2,3-diacetoxy) butyrate. (B. P. 107° to 108° C./5 mm., Refractive Index 1.4316 at 20° C.).

*Example IV*

40 parts of methyl (2-methyl-2,3-diacetoxy) butyrate are pyrolized in an atmosphere of nitrogen at 480° C. The crude product, consisting of 19.3 parts of a yellow liquid, is diluted with water, neutralized with sodium hydroxide solution and extracted with ether. After removal of the ether from the extract, the residue is fractionally distilled and the dimer of 2-carbomethoxy-1,3-butadiene is obtained in good yield (B. P. 106° to 108° C. at 1 mm.).

Similarly, when other substituted butanes of the formula given hereinabove are pyrolyzed in accordance with this invention, 2-carboalkoxy-1,3-butadienes are also obtained. Thus, for example, when 2-carbobutoxy-2,3-dibromo butane is pyrolyzed at a temperature of about 600° C., 2-carbobutoxy-1,3-butadiene is obtained, and 2-carboethoxy-1,3-butadiene is obtained when ethyl (2-methyl-2,3-dipropionoxy) butyrate is pyrolyzed at a temperature of about 700° C.

The dimers of 2-carboalkoxy-1,3-butadienes prepared by the method of this invention are very valuable for the preparation of monomers which may be used in the preparation of polymers and copolymers suitable as synthetic rubbers, synthetic resins and plastics as well as for many other uses.

Although specific examples are included herein, it is not intended to limit the invention thereto, for numerous variations and modifications will be apparent to those skilled in the art, and are included within the scope of the appended claims.

We claim:

1. A compound of the formula

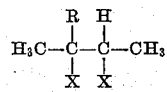

wherein R is a lower carboalkoxy radical and each X is selected from the class consisting of halogen and lower acyloxy radicals.

2. Methyl (2-methyl-2,3-diacetoxy) butyrate of the formula

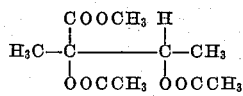

3. 2-carbomethoxy-2,3-dibromo butane of the formula

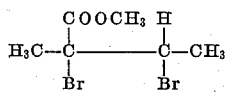

JEROME C. WESTFAHL.
DANIEL S. SEARS.

REFERENCES CITED

The following references are of record in the file of this patent:

Bloomfield, Jour. Chemical So., London, 1933, 800–806.

Fittig, Beilstein, 4th ed., vol. 3, p. 400.